United States Patent [19]

Hitchner

[11] Patent Number: 4,689,238

[45] Date of Patent: Aug. 25, 1987

[54] COMPOSITE FOOD PRODUCT

[75] Inventor: Elinor Hitchner, Irving, Tex.

[73] Assignee: Frito-Lay, Inc., Dallas, Tex.

[21] Appl. No.: 662,971

[22] Filed: Oct. 18, 1984

[51] Int. Cl.$^4$ ............................................. A23P 1/16
[52] U.S. Cl. .................................... 426/571; 426/564; 426/576; 426/568; 426/89; 426/93
[58] Field of Search ............... 426/89, 93, 573, 576, 426/564, 568, 309, 571

[56] References Cited

U.S. PATENT DOCUMENTS

| | | | |
|---|---|---|---|
| 2,558,065 | 6/1951 | Tice | 426/576 |
| 2,587,806 | 3/1952 | Alikonis | 426/564 |
| 2,844,468 | 7/1958 | Gunther | 426/564 |
| 3,431,112 | 3/1969 | Durst | 426/89 |
| 3,490,920 | 1/1970 | Grettie | 426/571 |
| 3,726,693 | 4/1973 | Harris | 426/93 |
| 4,409,248 | 10/1983 | Lehnhardt et al. | 426/564 |
| 4,451,488 | 5/1984 | Cook et al. | 426/93 |

Primary Examiner—Raymond N. Jones
Assistant Examiner—Carolyn Paden
Attorney, Agent, or Firm—Bernard, Rothwell & Brown

[57] ABSTRACT

A shelf-stable, composite food product comprising a dual-texture, low water activity binder having at least one food-flavoring material distributed therein is disclosed. The dual-texture, low water activity binder is prepared from a chewy, gelatinous binder material comprising a gelled solution of gelatin in glycerol and a crisp binder material comprising a stabilized protein foam. The product has a unique combination of crunchiness and chewiness without perceptible textural dichotomy.

21 Claims, No Drawings

COMPOSITE FOOD PRODUCT

BACKGROUND OF THE INVENTION

This invention relates to the production of shelf-stable composite food products, particularly composite snack food products, having a unique texture which is both crispy and chewy, yet does not give the impression of textural dichotomy.

Texture is a major factor in determining consumer acceptance in the food industry, particularly where snack foods are concerned. Consequently, the snack food industry continually strives to develop products having unique texture characteristics or unusual combinations of texture and flavor characteristics which are pleasing to the consumer. Studies of consumer preferences have repeatedly shown a marked preference for products which combine different textures, for example, products which are both chewy and crunchy. Some products achieve this combination of textures by incorporating discrete regions of food products having different textures. This type of product is exemplified by so-called "granola bars", which have a chewy binder material containing a plurality of food pieces of differing texture, such as nuts, cereals, seeds, dried fruits, etc., distributed throughout the binder. Products having discrete, distinguishable regions of differing textures are characterized herein as having textural dichotomy or textural variety.

Products of the prior art having textural dichotomy or textural variety, resulting from the incorporation of food components of differing texture, have suffered from a problem of shelf stability. This problem has been caused by the migration of water from discrete food components of higher water content to food components of lower water content within the product. The migration of water causes individual food components to lose their texture and flavor identities over time. In products such as granola bars, the water activity of the binder matrix determines the rate at which moisture migrates from one component to another. Water activity, which is the ratio of the fugacity of water within the substance being studied (i.e., the binder) to the fugacity of pure water, can be considered to be a measure of the tendency of the substance to allow water migration.

SUMMARY OF THE INVENTION

This invention provides a shelf-stable food product having unique textural characteristics. More particularly, the product of the invention combines both crunchiness and chewiness in a single product without apparent textural dichotomy. That is, the crunchy and chewy textures are not each perceived as being confined to separate regions or domains within the product, but rather, both textures are perceived as being coexistent throughout the product.

The shelf-stable, composite food product of the invention comprises a dual-texture, low water activity binder having at least one food-flavoring material distributed therein. The dual-texture, low water activity binder comprises two binder materials. One is a crisp binder material comprising a whipped protein foam and a protein foam stabilizer. The other is a chewy binder material comprising a gelled solution of gelatin in glycerol. The binder materials employed have essentially no inherent flavor. Virtually any desired food-flavoring material can be distributed within the binder material to impart the desired flavors. The food-flavoring materials can be distributed continuously through the binder as, for example, in the case of sweeteners, or they can be distributed as discrete particles, for example, pieces of nuts, seeds, fruits, cereals and the like. The low water activity of the binder allows food items of varying texture and flavor to be incorporated into the product without danger that water migration will cause the individual items to lose their texture or flavor identities during shipping and storage.

The invention also provides a method of preparing a shelf-stable, composite food product. In accordance with the method of the invention, a chewy, gelatinous binder material is prepared by dissolving gelatin in glycerol, whipping the solution into a foam and then cooling the solution to form a low water activity, chewy binder. A stabilized protein foam is prepared by whipping an aqueous solution of a whipping protein and adding a protein foam stabilizer. Food-flavoring materials are admixed with the whipped protein foam and/or the gelatin-in-glycerol solution. The whipped protein foam and the chewy, gelatinous binder material containing the food-flavoring materials are heated in contact with each other at a temperature above the melting point of the chewy gelatinous binder material to remove water from the product and to melt the chewy, gelatinous binder material and distribute it within the protein foam. Upon drying, the whipped protein foam takes on a crisp, dimensionally stable structure. The product is then cooled, allowing the chewy, gelatinous binder material, which is distributed throughout the stabilized protein foam, to set up.

DETAILED DESCRIPTION OF THE INVENTION

As previously indicated, the product of the invention comprises at least one food-flavoring material which is distributed within a dual-texture, low water activity binder. The binder comprises a chewy, gelatinous binder material and a crisp binder material.

The chewy, gelatinous binder material comprises a gelled solution of gelatin in glycerol. Type A gelatin, i.e., gelatin derived from acid-processed collagen usually obtained from porkskins, is preferred for use in the preparation of the chewy, gelatinous binder material. The Bloom strength of the gelatin employed is preferably from about 150 grams to 225 grams. The gelatin can be dissolved in glycerol at temperatures above 60° C. and the solution forms a gel at temperatures below about 35° C. The chewy, gelatinous binder material is prepared by heating the glycerol and dissolving the gelatin therein. The gelatin-in-glycerol solution comprises from about 1% to 10% gelatin, based on the total weight of the chewy, gelatinous binder material, preferably from about 2% to 5% gelatin.

The balance of the gelatin-in-glycerol solution comprises glycerol and, if desired, other diluents, texture modifiers or processing aids which may impart desirable characteristics to the chewy, gelatinous binder material. Since glyercol in high concentrations may impart a slight off-taste to the product, it is preferred that the gelatin-in-glycerol solution contain from about 5% to 40% glycerol, most preferably from about 15% to 25%. The remainder of the solution is preferably a polyhydric alcohol such as a LONZA ® polyol. Although gelatin per se is not soluble in polyhydric alcohols, the polyhydric alcohols can serve as diluents for the combined gelatin and glycerol, thus reducing any off-taste contributed by the glycerol.

Food-flavoring materials may also be admixed with the heated gelatin-in-glycerol solution, as described in detail below. The heated gelatin-in-glycerol solution is whipped, using any convenient means such as a Kitchenaid ® mixer equipped with a wire whip, to produce a foam. The foamed solution is then cooled to allow the chewy, gelatinous binder material to set up.

The chewy, gelatinous binder material can also contain, in addition to food-flavoring materials, texture modifiers such as fats. Fats may be added in amounts up to about 40% by weight of the binder in order to provide smoothness or "mouthfeel" to the product. If fats are present, then a small amount of a food grade emulsifier such as lecithin will also be present in amounts generally less than 1% by weight of the binder to aid in dispersion. Water may also be added to the chewy, gelatinous binder material in amounts up to about 25% by weight as a processing aid to assist in dissolving materials such as maltodextrins, however, essentially all of the water is removed from the final product in the heating step.

The crisp binder material comprises a whipped protein foam and a protein foam stabilizer. Any protein which is capable of being whipped in an aqueous solution to produce a foam having the desired consistency can be employed. One can mention, as merely exemplary of suitable proteins, soy protein isolate, egg albumin, soy albumin, gelatin and sodium caseinate. A preferred whipping protein for use in the invention is soy protein isolate. Enzyme modified soy protein isolate, sold by Staley as GUNTHER'S D-100WA, is particularly useful.

The whipping protein is provided in an aqueous solution at a concentration which is suitable for whipping into a foam. Generally, a protein concentration of from about 1% to 5% (w/w) can be employed. In the case of sodium caseinate, it is preferred to use a solution of from about 3% to 5% (w/w) protein. A preferred solution for producing the whipped foam is a 2% solution of enzyme modified soy protein isolate. The pH of the solution is adjusted, if necessary, to a range from about 3.5 to 4.5, preferably to about 4.0, prior to whipping.

The protein solution can be whipped to produce a protein foam using conventional equipment, such as a mixer equipped with a wire whip. The protein solution is preferably chilled prior to whipping. Typically, we have found that a 2% solution of enzyme modified soy protein isolate (pH 4.0) can be whipped to the desired consistency using a KITCHENAID ® mixer equipped with a wire whip (speed 10) in about 2 minutes.

The protein foam stabilizer is a polysaccharide or gum which is capable, with or without a co-stabilizing agent, of gelling the protein foam so that the foam forms a dimensionally-stable matrix upon drying. As used herein, the term "polysaccharide" excludes disaccharides such as sucrose. Suitable protein foam stabilizers include carageenan; xanthan gum; hydroxypropylmethyl cellulose; guar gum; xanthan gum co-stabilized with hydroxypropylmethyl cellulose; hydroxypropylmethyl cellulose co-stabilized with guar gum; guar gum co-stabilized with sodium alginate; pectin co-stabilized with sugar and an organic acid such as citric acid; sodium alginate co-stabilized with guar gum and a calcium ion source; and mixtures of sodium and calcium alginates co-stabilized with a calcium ion source.

The protein foam stabilizer and the co-stabilizer(s), if present, can simply be admixed with the whipped protein foam. In the case where a calcium ion source is used as a co-stabilizing agent, the primary stabilizer(s) can be admixed with the protein foam and the foam can then be immersed in an aqueous setting bath containing a calcium ion source such as food grade calcium lactate. Alternatively, milk solids, such as non-fat dry milk, or cheese solids can be admixed with the foam to serve as both a co-stabilizing calcium ion source and a food-flavoring material.

The primary stabilizer is added to the protein foam in an amount of from about 1% to 10%, based on the wet weight of the protein foam. Preferred amounts for various stabilizers are: xanthan gum, 1–2%; hydroxypropylmethyl cellulose, 5–10%; guar gum, 2–5%; carageenan, 2–5%; pectin, 2–6%; sodium alginate, 4–6%; sodium/calcium alginate, 1–3%. Gums used as co-stabilizing agents are generally employed in an amount from about 10% to 20%, based on the weight of the primary stabilizer. When the foam is stabilized by immersion into a setting bath containing a calcium ion source, the concentration of calcium ions in the bath is preferably from about 1% to 2% (w/w). When milk solids are employed as a co-stabilizing source of calcium ions, they are generally present, for stabilizing purposes, at levels of from about 500% to 700%, based on the weight of the primary stabilizer. However, greater amounts may be used as food-flavoring materials.

Virtually any natural or synthetic foods or flavorings (all of which are intended to be included within the term "food-flavoring materials") can be distributed throughout the binder to impart the desired flavor characteristics to the product. Since the binder materials are generally flavorless, the product can be made to take on any desired flavor by the appropriate selection of the food-flavoring materials. Preferably, food-flavoring materials are provided to both the chewy, gelatinous binder material and the crisp binder material. The food-flavoring materials are provided to the chewy, gelatinous binder material by dissolving or mixing them into the heated solution of gelatin in glycerol either before or after it is whipped to a foam. The food-flavoring materials are provided to the crisp binder material by mixing them into the whipped protein foam.

The food-flavoring materials which can be employed include materials which are soluble or capable of being distributed continuously throughout the binder materials as well as particulate food items which form discrete regions of texture and flavor within the product. One can mention, as merely exemplary of food-flavoring materials useful in the product of the invention, sweeteners such as honey, high fructose corn syrup, maltodextrins, brown sugar, and polyhydric alcohol sweeteners such as sorbitol or mannitol; spices; herbs; artificial flavorings; natural flavorings such as vanilla, cocoa, cinnamon and the like; vegetable purees (preferably less than 75% water); fruit purees (preferably less than 75% water); cheese solids; milk solids; discrete particles of fruits, vegetables, nuts, seeds, candies, coconut, etc. Other suitable food-flavoring materials within the scope of the invention will be readily apparent to those skilled in the art.

The amount of food-flavoring material which can be provided to the chewy, gelatinous binder material is preferably not more than about 200% the weight of the chewy, gelatinous binder material. I have found that the whipped protein foam is capable of supporting up to about 300% of its weight (wet foam weight) in food-flavoring materials without loss of dimensional stability, that is, without foam collapse.

The ratio of chewy, gelatinous binder to crisp binder can vary over a wide range, depending on the properties desired in the final product. For example, one can employ a high ratio of chewy binder to stabilized protein foam to obtain a final product with a predominantly chewy texture. On the other hand, one can employ a high ratio of stabilized protein foam to chewy binder to obtain a final product with a predominantly crispy texture. Preferably, the weight ratio of chewy binder to stabilized protein foam (wet weight) is from about 1:3 to 3:1.

The chewy, gelatinous binder material and the stabilized protein foam, which forms the crisp binder material, are heated in contact with each other at a temperature above the melting temperature of the chewy, gelatinous binder material, preferably above 50° C. Heating serves to melt the chewy, gelatinous binder material and distribute it through the stabilized protein foam which forms the crisp binder material. It also serves to remove water from the product. The heating step can be performed by embedding the chewy, gelatinous binder material (which has been whipped into a foam), in the form of strips or pieces, into the stabilized protein foam in a product mold which has been coated with a mold release agent such as vegetable cooking spray. The mold is then placed in a convection oven, preferably at a temperature of about 50°-65° C. The product is heated for a sufficient period of time to reduce the water content to below about 5%, preferably below about 2%. Removal of the water causes the stabilized protein foam to become rigid and crisp. Generally, we have found that heating times of from about 2-8 hours are sufficient, depending upon the individual product formulation. The product is then removed from the oven, cooled and removed from the mold. Upon cooling, the chewy, gelatinous binder material, which has been distributed within the stabilized protein foam, resolidifies.

The product thus produced has a unique combination of crunchiness and chewiness, without perceptible textural dichotomy, i.e., it is simultaneously crunchy and chewy throughout. Because of its low water activity, below about 0.35, the product is highly shelf-stable and individual food particles, if present, will not lose their texture or flavor identities through the migration of moisture. It will be readily apparent that the product can be produced in a wide variety of forms and flavors. If desired, the product of the invention can be laminated, coated or filled with other, conventional food materials to produce combination products.

The following example is intended to further illustrate the invention and is not intended to limit the scope of the invention in any way.

EXAMPLE

Preparation of Chewy, Gelatinous Binder Material 58.2 g glycerol (Witco 99.5% KEMSTRENE glycerol) and 232.8 g polyol (Lonza HM75, polyhydric alcohol sweetener) were combined and heated to 60° C. with stirring. Nine g gelatin (Atlantic, General Foods Corp., type A, 225 Bloom) was dissolved in the glycerol/polyol mixture with stirring. The hot gelatin solution was transferred to a glass bowl in a heated water bath and whipped to a foam using a Sunbeam hand mixer.

The foam is flavored and poured on a tray coated with vegetable cooking spray (PAM ®). The whipped foam is allowed to set up overnight and cut into strips of a size slightly smaller than the desired bar shape of the finished product. If desired, a strip produced in this manner can contain additional flavoring agents or solid food bits such as granola, fruit bits, etc.

Preparation of Crisp Binder Material

Ten g of enzyme modified soy protein (GUNTHER'S D-100WA) were dissolved in 500 ml deionized water. The pH was adjusted to 4.0, using 12N HCl and the solution chilled to 4° C. The chilled protein solution was beaten to a stiff foam using a KITCHENAID ® mixer with a wire whip attachment. A 200 g aliquot of foam was weighed out and 8.0 g sodium alginate (LACTICOL F537/F538) is beaten in. Fifty g of non-fat dry milk were beaten in, followed by 80 g of confectioner's sugar (10x). Two g of honey flavoring (ALEX FRIES, Natural Amber Honey Flavor WONF #78-881) and 200 g of granola bits were mixed in.

Preparation of Granola Bar

Forms sprayed with vegetable cooking spray (PAM) were half-filled with the granola foam. A strip of the whipped, chewy, gelatinous binder material was inserted in each form, and the forms filled with granola-flavored protein foam. The forms were placed in a convection oven (Blue M convection oven) at 50°-65° C. for 4-8 hours.

The resulting granola bars had the property of being crispy and chewy at the same time, without textural dichotomy. The water activity of the product was about 0.235.

What is claimed is:

1. A shelf-stable, composite food product produced by the process which comprises:
   (a) dissolving gelatin in heated glycerol thereby forming a solution, whipping the solution into foam and cooling the foamed solution to form a chewy, gelatinous binder material;
   (b) whipping an aqueous solution of a whipping protein and adding a protein foam stabilizer to the whipped protein to form a stabilized protein foam, said whipping protein selected from the group consisting of soy bean protein isolate, egg albumin, soy albumin, and sodium caseinate;
   (c) admixing a food-flavoring material with the gelatin-in-glycerol solution and/or the whipped protein foam;
   (d) heating the stabilized, whipped protein foam in contact with the chewy, gelatinous binder material, at a temperature above the melting point of the chewy, gelatinous binder material, to dry the whipped protein foam and melt the chewy, gelatinous binder material into the protein foam; and
   (e) cooling the composite product.

2. A shelf-stable, composite food product as claimed in claim 1, having a water activity below about 0.35.

3. A shelf-stable, composite food product as claimed in claim 1, wherein the whipping protein is soy protein isolate.

4. A shelf-stable, composite food product as claimed in claim 1, wherein the protein foam stabilizer is selected from the group consisting of carageenan; xanthan gum; hydroxypropylmethyl cellulose; guar gum; and co-stabilizing mixtures of hydroxypropylmethyl cellulose and xanthan gum; hydroxypropylmethyl cellulose and guar gum; pectin, sugar and an organic acid; sodium alginate, guar gum and a calcium ion source; and mixtures of sodium and calcium alginates and a calcium ion source.

5. A shelf-stable, composite food product as claimed in claim 1, wherein the protein foam stabilizer is a co-stabilizing mixture of sodium alginate and a calcium ion source.

6. A shelf-stable, composite food product as claimed in claim 5, wherein the calcium ion source is milk solids.

7. A shelf-stable, composite food product as claimed in claim 1, wherein the chewy, gelatinous binder material comprises from about 1% to 10% gelatin and from about 5% to 40% glycerol, based on the total weight of the chewy, gelatinous binder material.

8. A shelf-stable, composite food product as claimed in claim 1, wherein the chewy, gelatinous binder comprises from about 2% to 5% gelatin and from about 15% to 25% glycerol, based on the total weight of the chewy, gelatinous binder material.

9. A shelf-stable, composite food product as claimed in claim 7, wherein the chewy, gelatinous binder material contains a polyhydric alcohol other than glycerol.

10. A shelf-stable, composite food product as claimed in claim 8, wherein the chewy, gelatinous binder material contains a polyhydric alcohol other than glycerol.

11. A method of preparing a shelf-stable, composite food product which comprises:
   (a) dissolving gelatin in heated glycerol thereby forming a solution, whipping the solution into foam and cooling the foamed solution to form a chewy, gelatinous binder material;
   (b) whipping an aqueous solution of a whipping protein and adding a protein foam stabilizer to the whipped protein to form a stabilized protein foam;
   (c) admixing a food-flavoring material with the gelatin-in-glycerol solution and/or the whipped protein foam;
   (d) heating the stabilized, whipped protein foam in contact with the chewy, gelatinous binder material, at a temperature above the melting point of the chewy, gelatinous binder material, to dry the whipped protein foam and melt the chewy, gelatinous binder material into the protein foam; and
   (e) cooling the composite product.

12. A method of preparing a shelf-stable, composite food product as claimed in claim 11, wherein a whipping protein selected from the group consisting of soy protein isolate, egg albumin, soy albumin, gelatin and sodium caseinate is whipped to produce the stabilized protein foam.

13. A method of preparing a shelf-stable, composite food product as claimed in claim 11, wherein soy protein isolate is whipped to produce the stabilized protein foam.

14. A method of preparing a shelf-stable, composite food product as claimed in claim 11, wherein a protein foam stabilizer selected from the group consisting of carageenan; xanthan gum; hydroxypropylmethyl cellulose; guar gum; and co-stabilizing mixtures of hydroxypropylmethyl cellulose and xanthan gum; hydroxypropylmethyl cellulose and guar gum; pectin, sugar and an organic acid; sodium alginate, guar gum and a calcium ion source and sodium/calcium alginate and a calcium ion source is added to the whipped protein to produce a stabilized protein foam.

15. A method of preparing a shelf-stable, composite food product as claimed in claim 11, wherein sodium alginate and milk solids are added to the whipped protein to produce a stabilized protein foam.

16. A method of preparing a shelf-stable, composite food product as claimed in claim 11, wherein the amount of gelatin provided to the solution is from about 1% to 10% by total weight of the solution and the amount of glycerol is from about 5% to 40% by total weight of the solution.

17. A method as claimed in claim 11, wherein the amount of gelatin provided to the solution is from about 2% to 5% by total weight of the solution and the amount of glycerol provided to the solution is from about 15% to 25% by total weight of the solution.

18. A method as claimed in claim 16, wherein a polyhydric alcohol is also provided to the gelatin-in-glycerol solution.

19. A method as claimed in claim 17, wherein a polyhydric alcohol is also provided to the gelatin-in-glycerol solution as a diluent.

20. A method of preparing a shelf-stable, composite food product as claimed in claim 11, wherein the stabilized protein foam and the chewy binder material are heated, in contact with each other, at a temperature above about 50° C.

21. A method of preparing a shelf-stable, composite food product as claimed in claim 11, wherein the food-flavoring material(s) are added to the chewy, gelatinous binder in an amount up to about twice the weight of the chewy, gelatinous binder and the food-flavoring material(s) are added to the stabilized protein foam in an amount up to about three times the wet weight of the foam.

* * * * *